Sept. 14, 1948.　　　J. H. STARR　　　2,449,183
POWER LIFT FOR GRAIN DRILLS
Filed Jan. 15, 1944　　　2 Sheets-Sheet 1
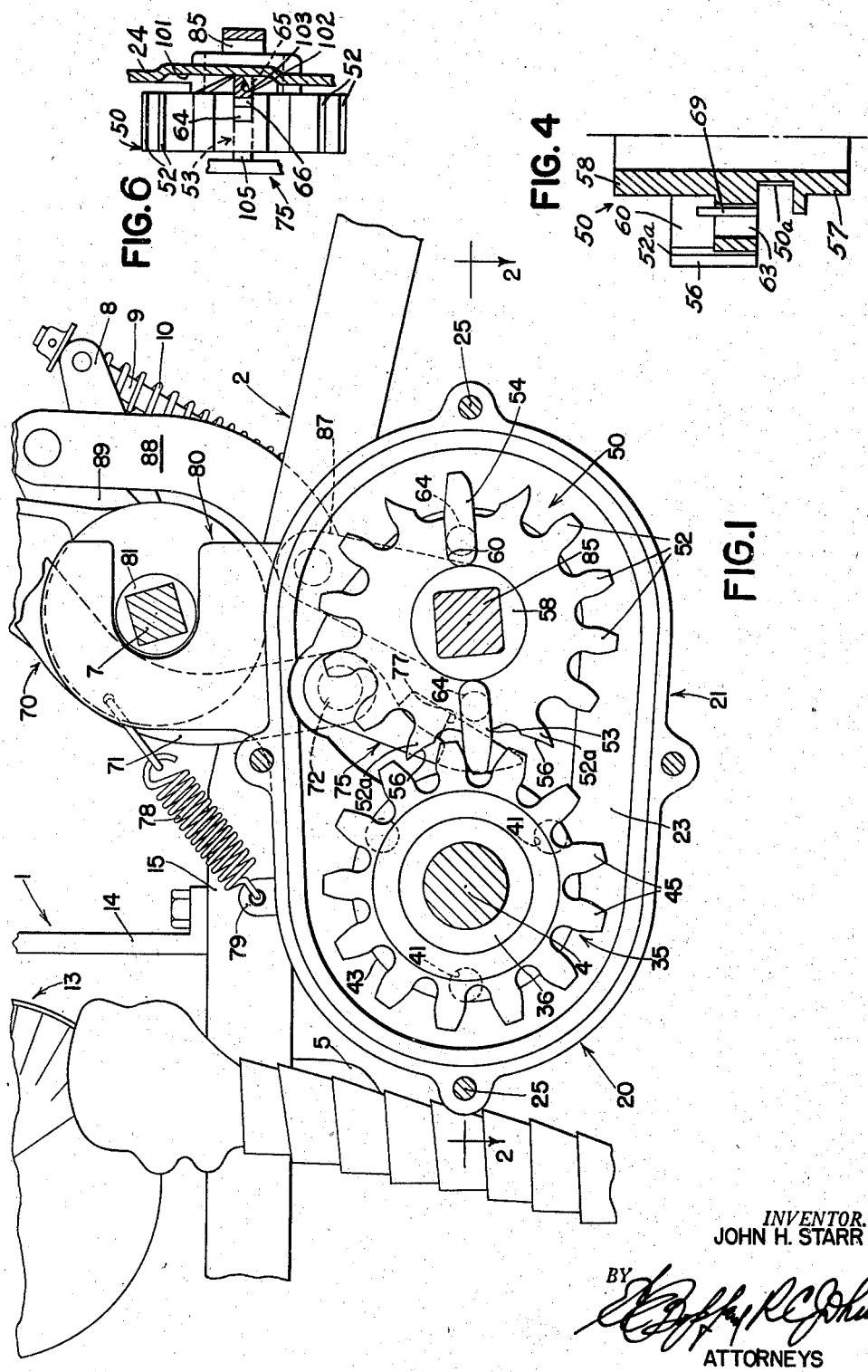
INVENTOR.
JOHN H. STARR
BY
ATTORNEYS Sept. 14, 1948. J. H. STARR 2,449,183
POWER LIFT FOR GRAIN DRILLS
Filed Jan. 15, 1944 2 Sheets-Sheet 2
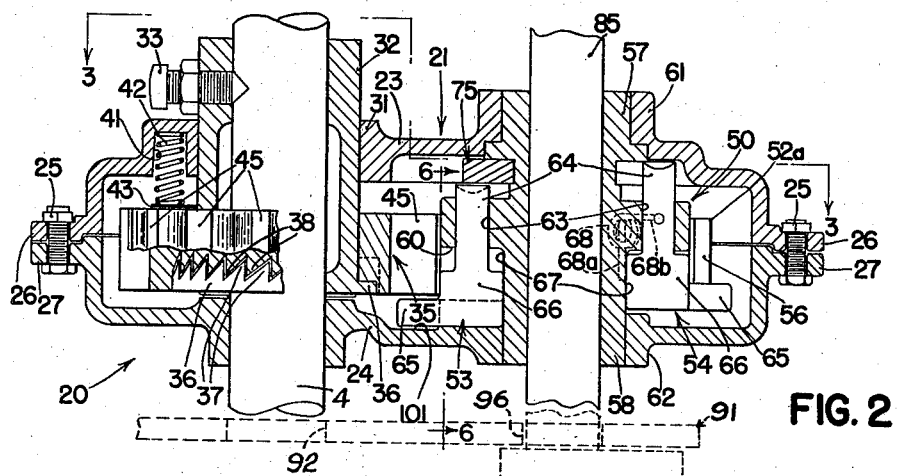
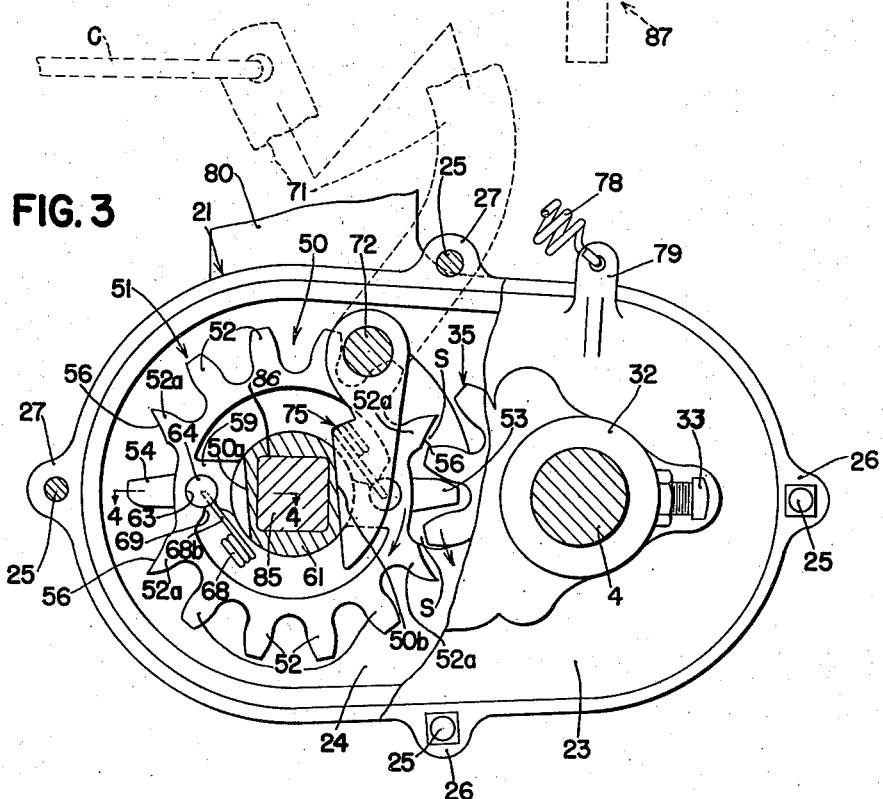
*INVENTOR.*
JOHN H. STARR
ATTORNEYS Patented Sept. 14, 1948

2,449,183

UNITED STATES PATENT OFFICE 2,449,183

POWER LIFT FOR GRAIN DRILLS

John H. Starr, Mayville, Wis., assignor to John Deere Van Brunt Company, a corporation of Wisconsin Application January 15, 1944, Serial No. 518,461

17 Claims. (Cl. 97—244)

The present invention relates generally to agricultural implements and more particularly to implements having ground working means adapted to be shifted into and out of operating and transport positions.

The object and general nature of the present invention is the provision of an agricultural machine having new and improved mechanism including self-interrupting clutch means of a simple and compact nature for controlling the lifting and lowering of the soil working means. More specifically, it is a feature of this invention to provide new and improved self-interrupting clutch mechanism which comprises driving and driven gear members with means for controlling the intermeshing and the disconnecting of said gear members. A further feature of this invention is the provision of a self-interrupting clutch of the mutilated gear type in which fixed teeth and relatively shiftable teeth are provided, with suitable means for controlling the position of said shiftable teeth and thereby act to control the connection between the driving and driven members.

These and other objects and advantages of the present invention will be apparent to those skilled in the art after a consideration of the detailed description of the preferred embodiment of the invention, illustrated in the accompanying drawings.

In the drawings:

Figure 1 is a side view, with certain parts shown in section, of a grain drill in which the principles of the present invention have been incorporated.

Figure 2 is an enlarged sectional view taken generally along the line 2—2 of Figure 1.

Figure 3 is a view from the other or reverse side of Figure 1.

Figure 4 is a section taken along the line 4—4 of Figure 3, the shiftable tooth being omitted.

Figure 5 is a fragmentary perspective view, showing the tooth-controlling latch member.

Figure 6 is a fragmentary sectional view taken along the line 6—6 of Figure 2, showing the means for ensuring full engagement of the clutch.

Referring now more particularly to Figure 1, the agricultural implement I have chosen to illustrate the present invention is represented as a grain drill 1 having a main frame 2 supported on ground wheels. The ground wheels are fixed or connected to drive axles 4 supported by bearing brackets 5 that are connected to the frame 2. Also supported on the frame is a pressure shaft 7 that is mounted for rocking movement and which carries pressure arms 8, and a lifting link 9 having disposed about it a compression spring 10 connecting each lifting arm 8 with a tool or furrow opener. A seed box 13 is supported by suitable brackets 14 on the frame 2, the seed box being disposed substantially above the axle 4 and somewhat rearwardly of the pressure shaft 7 which is disposed generally forwardly and above the axle 4. The pressure shaft 7 is mounted by any suitable means on the frame angles 15 for rocking movement thereon so as to raise or lower the tools. Generally, when the tools are in their soil working position the pressure arms 8 act through the compression springs 10 to hold the tools in their soil working position and yieldingly restrain upward movement thereof.

The present invention is not especially concerned with the particular details of the grain drill per se, the same being chosen as representative of an agricultural implement in which, by way of example, the principles of the present invention have been incorporated. Referring now more particularly to Figures 2 and 3, disposed about the axle 4 and shiftable generally longitudinally thereof, is a power lift unit indicated in its entirety by the reference numeral 20. The power lift unit 20 includes a casing 21 made up of two mating sections 23 and 24 connected together marginally by suitable securing bolts 25 passing through apertured lugs 26 and 27 formed on the casing sections 23 and 24. The casing section 23 includes a bearing boss 31 through which a gear hub 32 extends. The hub 32 may be locked to the axle 4 by set screw means 33. A gear member 35 is disposed within the housing or casing 21 and is carried by the inner end of the hub member 32. The latter is formed with a flange 36 having inclined clutch teeth 37, and the hub portion of the gear 35 is likewise formed with inclined teeth 38. The casing section 23 is formed with a plurality of spring sockets 41 in each of which a spring 42 is disposed. The springs 42 bear against thrust washers 43 so as to hold the gear member 35 in driving engagement with the toothed flange 36. The toothed constructions 37, 38, just described, form an overrunning clutch by which the axle 4 drives the gear member 35 in one direction but the gear member may overrun the axle 4 in that direction, the teeth 38 slipping over the teeth 37 by virtue of the yielding of the springs 42. The gear member 35 carries conventional spur teeth 45.

The gear member 35 and associated parts constitute the driving member of a self-interrupting clutch structure, the driven member of which will now be described and which is indicated in its entirety by the reference numeral 50. The driven member 50 includes a gear 51 of the mutilated type having conventional gear teeth 52 and a pair of axially shiftable tooth elements 53 and 54. The gear teeth 52a adjacent the shiftable tooth elements 54 are cut away, as at 56, so that, as best shown in Figure 3, a space S is provided in which no meshing takes place between the gear members 35 and 50 except through the shiftable tooth elements 53 or 54.

The driven gear member 50 includes hub sections 57 and 58 which are received, respectively, in hub sections 61 and 62 of the casing parts 23 and 24. A pair of generally axially directed bores 63 are formed in the body of the driven gear member 50 and receive the shank section 64 of the cooperating shiftable tooth element, 53 or 54. These tooth elements are substantially identical and, as best shown in Figure 2, each includes a tooth 65 carried by a generally rectangular section 66 to which the shank 64 is connected or formed integrally with and which is generally axially slidable in a socket 67 formed in the thickened part 59 of the gear 50, the part 59 also having a recess 60 to receive the section 66 of the shiftable tooth element. Each shiftable tooth element 53 or 54 is movable from a position in which the tooth 65 may be engaged by one of the teeth 45 on the driving member 35 to a position in which the tooth 65 is disposed axially beyond the teeth 45, in which the drive from one member to the other is interrupted. Each tooth element is provided with a coil spring 68 carried by the gear 50 and arranged so as to bias the associated tooth element for movement into a meshing position. One end 68a is anchored to the gear 50 in any suitable manner and the other end 68b extends through a slot 69 into the bore 63 and into engagement with the shank 64 of the associated shiftable tooth. The outer end of each shank 64 extends laterally beyond the side of the gear member 50 and cooperates with suitable controlling mechanism which is carried by the casing 21.

The controlling latch mechanism is indicated in its entirety by the reference numeral 70 and comprises a trip lever 71 fixed to a shank or pivot shaft 72 on a throwout dog 75. The shank 72 extends through a boss formed on one of the casing parts. The throwout dog 75 includes an angled section 76 forming a tooth-disengaging cam and an abutment section 77. A spring 78 is connected between the trip lever 71 and a lug 79 formed on one of the casing parts and serves to bias the trip lever 71 for movement in a direction to carry the throwout dog into its tooth-engaging position (Figure 2). By pulling on a cable C connected with the trip lever 71, the throwout dog 75 may be moved into its other position in which the spring biased shiftable tooth element may move into engagement with the driving gear 35 (Figures 1 and 2). To provide space for the necessary movement of the dog 75 toward the gear 50 the latter is recessed as at 50a and 50b.

Each of the casing sections 23 and 24 is formed with a hook portion 80, and these portions are adapted to engage over a bushing 81 carried by the pressure shaft 7, whereby the casing 21 is supported in part upon the axle 4 and in part upon the pressure shaft 7. The opening through the hub 57, 58 of the driven gear member 50 is preferably square and receives a crankshaft 85 which is square in section to fit the opening 86 in the gear 50. A crank 87 is fixed to one end of the crankshaft 85 and is connected through a link 88 with an arm 89 on the pressure shaft 7. The crankshaft 85 is of appreciable length and is supported, in part, by the casing 21 and, in part, by a plate 91 which is apertured, as at 92, to receive the axle 4 and the plate 91 is also apertured to receive a bushing on the pressure shaft 7. The plate 91 is apertured, as at 96, to receive the crankshaft 85. It will be observed that since the opening in the driven gear 50 through which the crankshaft 85 extends is square and that the bushing 81 with which the hook sections 80 are engaged is slidable along the pressure shaft 7, the entire power lift unit may be shifted laterally along the associated shafts, namely, the axle shaft 4, the pressure shaft 7, and the crankshaft 85, merely by loosening the set screw means 33 and shifting the unit to the position desired. This particular construction greatly facilitates the assembly of the power lift or self-interrupting clutch unit during manufacture and in addition, facilitates its application to grain drills of different models or construction, requiring only that the axle shaft 4 and the pressure and crankshafts 7, 85 be located in the same relative positions.

The operation of the preferred form of the present invention, described above, is believed to be clear from the foregoing description. Referring to Figures 2 and 3, it will be seen that the tooth element 53, as well as the tooth element 54, is out of engagement with the driving gear 35. Hence, the latter, which is carried by the axle 4, rotates idly. If the operator should desire to operate the unit 20 so as to lower the tools, a pull is momentarily exerted on the cable C, and this rocks the trip lever 71, carrying the throwout dog 75 out of engagement with the shank 64 of the tooth element 53. The spring 68 associated therewith immediately shifts the tooth element 53 so as to carry the tooth 65 thereof in the path of the teeth 45 on the driving gear 35. It will be observed that the initial meshing thus afforded is not required to transmit any great amount of power, merely sufficient to start the driven gear 50. After the gear 50 has been rotated a slight amount, the gear teeth 45 on the gear 35 engage the adjacent conventional gear teeth 52 on the gear 50, whereupon the latter continues to be driven and the crankshaft 85 rotated in the direction of the arrow shown in Figure 3, thus swinging the pressure shaft arm 89 downwardly and permitting the tools to be lowered into their operating position. Only a momentary pull on the cable C is necessary to initiate the operation of the power lift clutch. After the operation has started, the operator releases his pull on the cable C, so that the spring 78 then restores the trip lever 71 and associated parts into a position such that the throw-out dog 75 is disposed with its cam 76 in a position to engage the shank of the tooth element 54. As the gear 50 is rotated slightly beyond this point, the cam section 76 forces the shiftable tooth element 54 out of engagement with the driving gear 35, thus automatically interrupting the drive. As the shank of the tooth element, either 53 or 54, rides upon the cam section 76, the trip lever 71 is momentarily rocked until the shank passes the abutment section 77. The spring 78 then acts to cause the abutment face 77 to drop behind the shank 64, thus locking the driven element 50 against backward movement. The crank arms 87 and 89 are so arranged that this serves to hold the pressure shaft in one or the other of its positions.

As best shown in Figure 6, the casing section 24 is recessed, as at 104, to provide space for the tooth 65 when it is disengaged from the driving gear teeth 45. Each of the shiftable teeth 53 and 54 is provided with a cam section 102 and the adjacent portion of the casing section 24 is also provided with a cooperating stationary cam section 103. These parts are so arranged that when the shiftable tooth is in its disengaged position the cam sections 102 and 103 lie closely adjacent with one another so as to prevent further rotation of the driven gear 50. However, when the latch 75 is swung away from the other end of the shank 64, the latter being slabbed off, as at 105, to facilitate operating the shiftable tooth by the latch 75, the associated spring 68 brings the tooth 65 into engagement with the driving teeth 45. If, however, full engagement is not effected by the time the driven gear starts to move, the stationary cam section 103 acts against the cam section 102 on the tooth, positively forcing it axially of the driven member and into full engagement with the driving gear member, thus insuring that full engagement is effected before the driven member is rotated more than a relatively small amount.

While I have shown and described above the preferred structure in which the principles of the present invention have been incorporated it is to be understood that my invention is not to be limited to the particular details shown and described above but that, in fact, widely different means may be employed in the practice of the broader aspects of my invention.

What I claim, therefore, and desire to secure by Letters Patent is:

1. In a grain drill having an axle and a pressure shaft mounted in substantial parallelism, and tool means adapted to be connected with the latter, power lift means for the latter comprising a power unit adapted to derive power from said axle and deliver the same controllably to said pressure shaft and through the latter to said tool means to raise the latter, said power unit comprising a driving member, a driven member, and means for controlling the connection between said members, and means slidably but non-rotatably connecting said members, respectively, with said axle and said pressure shaft, whereby said power unit may be disposed in different positions along said axle and shaft to raise said tool means.

2. In an agricultural implement including a pair of shafts disposed generally in parallelism, a power unit comprising a casing disposed about both of said shafts and shiftable generally longitudinally thereof into any one of a number of different positions, said power unit also including a driving member and a driven member disposed within said casing, and mechanism controllably connecting said members, and means providing for connecting said members with said shafts, respectively, at any one of a number of different positions therealong.

3. In a grain drill having an axle, a seed box disposed substantially directly above said axle, and a pressure shaft disposed generally forwardly of and above said axle and having means adapted to be connected with tool means for raising and lowering the same, power lift means for operating said pressure shaft, comprising a support carried by said axle and said shaft, a self-interrupting unit carried by said support in a position generally forwardly of said axle and substantially underneath said pressure shaft, gearing for driving said clutch from said axle, and means driven by said self-interrupting unit for operating said pressure shaft.

4. In a grain drill having an axle, a seed box disposed substantially directly above said axle, a pressure shaft disposed generally forwardly of and above said axle, and furrow openers adapted to be connected with said pressure shaft, power lift means for operating said pressure shaft for raising said furrow openers, comprising a self-interrupting unit carried at least in part by said axle and disposed generally forwardly thereof substantially underneath said pressure shaft, means driven by said self-interrupting unit for operating said pressure shaft so as to lift said furrow openers, and means for supporting at least a portion of said self-interrupting unit on said pressure shaft.

5. In a grain drill having an axle, a seed box disposed substantially directly above said axle, a pressure shaft disposed generally forwardly of and above said axle, and furrow openers adapted to be connected with said pressure shaft, power lift means for operating said pressure shaft for raising said furrow openers, comprising a self-interrupting unit carried at least in part by said axle and disposed generally forwardly thereof substantially underneath said pressure shaft, means driven by said self-interrupting unit for operating said pressure shaft so as to lift said furrow openers, a casing enclosing and forming a part of said self-interrupting unit, means supporting one portion of said casing on said axle, and means supporting another portion of said casing on said pressure shaft.

6. In an agricultural implement, an axle, a rockshaft and a crankshaft disposed generally in parallelism, a casing receiving said crankshaft and mounted on said axle and rockshaft, a self-interrupting unit disposed within said casing and mounted on said crankshaft, means connected with said axle for driving said unit, and means for driving said crankshaft from said self-interrupting unit.

7. In agricultural implements and the like having a driving shaft and a driven shaft disposed generally in parallelism, power lift means comprising driving gear operatively connected to be driven by said driving shaft, a second gear non-rotatably connected with said driven shaft and disposed thereon in a position to mesh with said driving gear, said driven gear having an axially shiftable tooth element adapted to be moved out of engagement with the teeth on said driving gear, whereby to interrupt the transmission of force from the driving gear to the driven gear, means for biasing said tooth element for movement into meshing position, means adapted in one position to disengage said shiftable tooth element from said driving gear, and means controlled by said disengaging means for holding said driven gear in a position in which it is out of mesh with said driving gear so long as said shiftable tooth element is held out of mesh with said driving gear.

8. A power lift unit for agricultural implements and the like, comprising a pair of gears mounted in a position to mesh one with the other, one constituting a driving gear and the other constituting a driven gear, said driven gear having tooth means, including a shiftable tooth element adapted, in one position, to mesh with the teeth of said driving gear and to cause the latter to turn said driven gear into a position where the driving gear meshes with the other teeth of said driven gear, mechanism controlling the position of said shiftable tooth element, and a part operated by said mechanism and engageable with a part of said driven gear for locking the latter in position when said shiftable tooth element is out of said one position.

9. A power lift unit for agricultural implements and the like, comprising a pair of gears mounted in a position to mesh with each other, one constituting a driving gear and the other constituting a driven gear, said driven gear having tooth means, including a shiftable tooth element adapted, in one position, to mesh with the teeth of said driving gear and to cause the latter to turn said driven gear into a position where the driving gear meshes with the other teeth of said driven gear, and mechanism controlling the position of said shiftable tooth element, said shiftable tooth element being mounted for movement relative to the main body of the driven gear and including a shank extending from one side of said driven gear, and a movable controlling latch member adapted, in one position, to engage the shank of said shiftable tooth element and in response to movement of said driven gear shift said tooth element into a position out of mesh with said driving gear, whereby the drive from one gear to the other is interrupted.

10. In an agricultural implement having a part to be operated by power, a driving member, a driven member, a shiftable part connected with the driven member and adapted to be moved from a position extending generally outwardly of said driven member into a position generally axially inwardly of said first position and engaging the driving member for connecting said members, a support on which said members are mounted, and means disposed in a position adjacent the path of movement of said shiftable part and acting between said support and said part for moving the latter into said second position so as to be disposed in full engagement with the driving member after the driven member has started to move.

11. In an agricultural implement, a power lift unit including a pair of intermeshing gears, one constituting the driving gear and the other constituting the driven gear, said driven gear comprising a gear of the mutilated type having a space between certain of the teeth thereof whereby, when said space moves into a position adjacent the driving gear, the latter gear is out of mesh with said driven gear, and means carried by said driven gear movable into a position to engage the driving gear whereby rotation of the latter acts therethrough to initiate rotation of the driven gear so as to cause the teeth on the latter to move into a position to mesh with the teeth on the driving gear, whereby the drive from one gear to the other is established, and a controlilng latch member movable into a position to engage said movable means on the driven gear and shift said movable means out of meshing engagement with said driving gear, said latch means having a portion engageable with said movable means for restraining said driven gear against further movement in at least one direction.

12. In agricultural implements and the like having a driving shaft and a driven shaft disposed generally in parallelism, power lift means comprising a casing enclosing said shafts, a driving gear disposed in said casing and operatively connected to be driven by said driving shaft, a second gear non-rotatably connected with said driven shaft and disposed thereon in a position to mesh with said driving gear, said driven gear having an axially shiftable tooth element adapted to be moved out of engagement with the teeth on said driving gear, whereby to interrupt the transmission of force from the driving gear to the driven gear, means for biasing said tooth element for movement into meshing position, an arm pivotally mounted on said casing on the inside thereof in a position for controlling the position of said shiftable tooth element, and means on the outside of said casing for operating said arm.

13. In agricultural implements and the like having a driving shaft and a driven shaft disposed generally in parallelism, power lift means comprising a casing enclosing said shafts, a driving gear disposed in said casing and operatively connected to be driven by said driving shaft, a second gear non-rotatably connected with said driven shaft and disposed thereon in a position to mesh with said driving gear, said driven gear having an axially shiftable tooth element adapted to be moved out of engagement with the teeth on said driving gear, whereby to interrupt the transmission of force from the driving gear to the driven gear, means for biasing said tooth element for movement into meshing position, an arm pivotally mounted on one side of the casing on the inside thereof in a position for controlling the position of said shiftable tooth element, means on the outside of said casing for operating said arm, and means on the other side of said casing for engaging said shiftable tooth element for ensuring full engagement when said arm is shifted to a position providing for movement of said tooth element into a position engaging said driving gear.

14. In an agricultural implement having means serving as a drive shaft and a driven shaft having means adapted to be connected with tool means for raising and lowering the latter, power lift means therefor comprising a pair of gears connected non-rotatably with said shafts, respectively, one of said gears having an axial opening therethrough adjacent its periphery and a recess at one side between adjacent teeth, a shiftable tooth element mounted in said recess and shiftable therein, said tooth element having a shank extending laterally through said axial opening at the other side of said one gear, and means at said other side of said one gear and engageable with said shank for controlling the position of said shiftable tooth element, and means connecting said one gear with said driven shaft, whereby operation thereof raises said tool means.

15. A power lift unit for agricultural implements and the like, comprising a pair of gears mounted in a position to mesh one with the other, one constituting a driving gear and the other constituting a driven gear, said driven gear having tooth means, including an axially shiftable element having at one side of the gear a tooth portion and an operating shank extending beyond the other side of the gear, said tooth portion, in one position of said axially shiftable element, being constructed and arranged to mesh with the teeth of said driving gear and to cause the latter to turn said driven gear into a position where the driving gear meshes with the other teeth of said driven gear and mechanism controlling the position of said shiftable tooth element, said mechanism including a first part constructed to engage said shank and shift said element and a second part constructed to engage said shank and lock said driven gear against backward movement.

16. In an agricultural implement the combination with a self-interrupting unit including driving and driven members and a part carried by said driven member and adapted to be moved relative to said driven member from a position partially engaging said driving member into a position fully engaging said driving member, of a relatively stationary part disposed adjacent said shiftable part and having a cam-like section adapted to engage said shiftable part when said driven member is moved with said shiftable part in said partially engaged position and move said shiftable part into a position fully engaging said driving member.

17. The invention defined in claim 16, further characterized by a casing at least partially enclosing said driven member and carrying said relatively stationary part.

JOHN H. STARR.

REFERENCES CITED

The following references are of record in the file of this patent:

UNITED STATES PATENTS

| Number | Name | Date |
|---|---|---|
| 1,378,432 | Towle | May 17, 1921 |
| 1,463,612 | Davis | July 31, 1923 |
| 1,463,613 | Davis | July 31, 1923 |
| 1,642,606 | Jouette | Sept. 13, 1927 |
| 1,751,951 | Schaeffer | Mar. 25, 1930 |
| 1,937,326 | Pick | Nov. 28, 1933 |
| 2,053,795 | Keith et al. | Sept. 8, 1936 |
| 2,309,152 | Woodruff et al. | Jan. 26, 1943 |
| 2,314,235 | Morris | Mar. 16, 1943 |

FOREIGN PATENTS

| Number | Country | Date |
|---|---|---|
| 604,645 | France | Jan. 30, 1926 |

Certificate of Correction

Patent No. 2,449,183.

September 14, 1948.

JOHN H. STARR

It is hereby certified that errors appear in the printed specification of the above numbered patent requiring correction as follows:

Column 6, line 51, claim 7, before the word "driving" insert *a*; column 7, line 55, claim 11, strike out "and" before "means" and insert the same before "movable" in line 56, same claim; line 62, same claim 11, for "controlilng" read *controlling*; and that the said Letters Patent should be read with these corrections therein that the same may conform to the record of the case in the Patent Office.

Signed and sealed this 28th day of December, A. D. 1948.

[SEAL]

THOMAS F. MURPHY,
*Assistant Commissioner o*,